(12) United States Patent
Nakazawa

(10) Patent No.: US 8,918,890 B2
(45) Date of Patent: Dec. 23, 2014

(54) METHOD OF MANAGING SOFTWARE LICENSE CONTRACTS, SYSTEM AND INFORMATION PROCESSING APPARATUS THEREFOR, AND TARGET SOFTWARE FOR LICENSE CONTRACTS

(75) Inventor: Toshiyuki Nakazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 501 days.

(21) Appl. No.: 12/936,881

(22) PCT Filed: Jun. 18, 2009

(86) PCT No.: PCT/JP2009/061545
§ 371 (c)(1),
(2), (4) Date: Oct. 7, 2010

(87) PCT Pub. No.: WO2010/001788
PCT Pub. Date: Jan. 7, 2010

(65) Prior Publication Data
US 2011/0030066 A1 Feb. 3, 2011

(30) Foreign Application Priority Data

Jun. 30, 2008 (JP) ................................ 2008-171242

(51) Int. Cl.
*G06F 7/04* (2006.01)
*G06F 17/30* (2006.01)
*H04N 7/16* (2011.01)
*G06Q 30/02* (2012.01)
*G06Q 30/06* (2012.01)

(52) U.S. Cl.
CPC ............... *G06Q 30/06* (2013.01); *G06Q 30/02* (2013.01)
USPC ........................................... 726/26; 713/182

(58) Field of Classification Search
USPC ......................................................... 726/26
See application file for complete search history.

(56) References Cited

U.S. PATENT DOCUMENTS

2001/0037403 A1* 11/2001 Mougi et al. ................. 709/238
2004/0093599 A1* 5/2004 Reynaud ...................... 717/177
2006/0031172 A1* 2/2006 Otsuka .......................... 705/59

FOREIGN PATENT DOCUMENTS

| JP | 2001-312325 | 11/2001 |
| JP | 2003-29862 | 1/2003 |
| JP | 2005-78167 | 3/2005 |
| JP | 2006-48527 | 2/2006 |

OTHER PUBLICATIONS

Lisa Brownsword; Developing New Processes for COTS-based system; Aug. 2000; IEEE; pp. 1-8.*

* cited by examiner

*Primary Examiner* — Michael S McNally
*Assistant Examiner* — Monjour Rahim
(74) *Attorney, Agent, or Firm* — Fitzpatrick, Cella, Harper & Scinto

(57) ABSTRACT

A URL, to launch a license contract registration process, in software which requires license registration is informed to a license contract information input server which executes a process of inputting information necessary for license registration. After input of the necessary information, the license contract information input server transfers a request for license registration to the informed URL. The information necessary for license registration is inputted in accordance with a format arbitrarily created by the license contract information input server. A Web browser used by a user to operate a license contract registration process and license management target software can run on different hosts. After distribution of the target software for a license contract, information to be input by the user at the time of license contract can be changed.

17 Claims, 14 Drawing Sheets

FIG. 5

NO LICENSE CONTRACT HAS BEEN REGISTERED YET FOR THE SOFTWARE. THE REMAINING TRIAL PERIOD OF THE SOFTWARE IS 13 DAYS. TO CONTINUOUSLY USE THE SOFTWARE, YOU NEEDS TO REGISTER A LICENSE CONTRACT.

501 — REGISTER A LICENSE CONTRACT NOW

502 — REGISTER A LICENSE CONTRACT LATER

FIG. 6

NO LICENSE CONTRACT HAS BEEN REGISTERED YET FOR THE SOFTWARE. TO USE ALL FUNCTIONS OF THE SOFTWARE, YOU NEEDS TO REGISTER A LICENSE CONTRACT.

601 — REGISTER A LICENSE CONTRACT NOW

602 — REGISTER A LICENSE CONTRACT LATER

FIG. 7

703 — HTTP/1.1 302 Found
Server: Microsoft-IIS/5.1
Date: Tue, 20 May 2008 05:41:00 GMT
X-Powered-By: ASP.NET
X-AspNet-Version: 2.0.50727
704 — Location: https://license.input.server.
com/license/euduser/index. jsp?
APPID=C0000000405&CPUID=AQAQAAAAO7SVLQAES
7IS&LANGUAGE=ja&APPLICATION=MyApp&VERSION
=2.1.0&RTURL=http%3a%2f%2f192.168.1.10%
2fMyApp%2fLicense%2fRegisterLicense.aspx?
Cache-Control: private
Content-Type: text/html; charset=utf-8
Content-Length: 360

} 701

<html><head><title>object moved</title></
head><body>
<h2>Object moved to <a href="https://
license.input.server.com/license/enduser/
index. jsp?APPID=C0000000405&amp;
CPUID=AQAQAAAAO7SVLQAES7IS&amp;
LANGUAGE=ja&amp;APPLICATION=MyApp&amp;
VERSION=2.1.0&amp;RTURL=http%3a%2f%
2f2f192.168.1.10%2fMyApp%2fLicense%
2fRegisterLicense.aspx?">here</a>.</h2>
</body></html>

} 702

F I G. 9

LICENSE CONTRACT REGISTRATION FOR THIS SOFTWARE WILL START.
COMPLETE THE FOLLOWING FORM AND PRESS "REGISTER".

SOFTWARE INFORMATION

- SOFTWARE NAME : MyApp ~801
- VERSION : 2.1.0 ~802
- LICENSE NUMBER : [ ] ~803

CUSTOMER INFORMATION

- COMPANY NAME : [ ] ~804
- SECTION NAME : [ ] ~805
- USER NAME : [ ] ~806
- TELEPHONE NUMBER : [ ] ~807
- E-MAIL ADDRESS : [ ] ~808
- E-MAIL ADDRESS (VERIFY) : [ ] ~809
- COUNTRY NAME : [ ] ~1210
- NUMBER OF EMPLOYEES : [ ] ~1211
- CATEGORY OF INDUSTRY : [ ] ~1212

810~ [ REGISTER ]

under 35
METHOD OF MANAGING SOFTWARE LICENSE CONTRACTS, SYSTEM AND INFORMATION PROCESSING APPARATUS THEREFOR, AND TARGET SOFTWARE FOR LICENSE CONTRACTS This application is a National Stage application under 35 U.S.C. §371 of International Application No. PCT/JP2009/061545, filed on Jun. 18, 2009, which claims priority to Japanese Application No. 2008-171242, filed on Jun. 30, 2008, the contents of each of the foregoing applications being incorporated by reference herein.

TECHNICAL FIELD

The present invention relates to a method of managing a software license contract, a system and information processing apparatus therefor, and target software for a license contract and, more particularly, to a method of managing a software license contract, which registers a software license using a Web browser, a system and information processing apparatus therefor, and target software for a license contract.

BACKGROUND ART

Conventionally, a use license associated with a software license is appended to a software medium. A user who has purchased the software installs and uses it by agreement of the use license. However, this allows the user to illegally copy and install the software.

There is also a method of making software usable by inputting an identifier such as a license number added to software. In this case as well, however, a user can illicitly install the software by copying the identifier together.

To solve the above problems, for example, the following method of granting a use license has been proposed. Target software for a license contract is partially encrypted. Based on, for example, a license number input by a user and information specific to a host on which the software runs, a license contract management server issues a key to decrypt the encrypted software. The software receives the key and decrypts the encrypted part of it, thereby restraining any other machine from executing the software (e.g., Japanese Patent Laid-Open No. 2005-078167).

There is also proposed a method of causing target software for a license contract to directly communicate with a license issuance server or a license contract management server on the Internet and receive activation of the license (e.g., Japanese Patent Laid-Open No. 2003-029862).

In the above-described prior arts, however, to receive acceptance of the license contract online, the host on which target software for a license contract runs must be the same as the host which performs the operation for the license contract. This leads to the following problem if the target software for a license contract is a Web application. It is difficult to make a license contract by communicating with a license contract management server using a Web browser that runs on a host different from a host on which the target software for a license contract runs.

Especially, when inputting, to the license contract management server using the Web browser, information such as a user's address and telephone number except information such as a license number necessary for license contract management, the Web browser must communicate with the license contract management server. In this case, license issuance is particularly difficult. This is because if the Web browser is running on a host different from a host on which the target software for a license contract runs, the communication between the target software for a license contract and the license contract management server is disconnected.

DISCLOSURE OF INVENTION

The present invention has been made in consideration of the above problems, and enables a Web browser to be used by a user to operate a license contract registration process and target software for a license contract to run on different hosts.

The present invention also enables to change information to be input by a user after distribution of target software for a license contract by arranging a license contract information input server on the Internet.

According to one aspect of the present invention, there is provided a system for managing a software license contract, in which a license contract server, a first computer for executing target software which is a target of a license contract, and a second computer for performing the license contract of the target software are connected separately, wherein the first computer comprises: means for requesting the second computer to transfer, to a URL of the license contract server for license contract information input, a request including a part of license contract information necessary for the license contract and a URL in the target software to launch a license contract registration process of the target software; and means for launching the license contract registration process at a point in which a verification notification including the license contract information from the license contract server is transferred to the URL in the target software via the second computer in response to the request transferred by the second computer, transmitting, to the license contract server, registration information necessary for license contract registration including the license contract information, and registering the license contract of the target software when receiving, from the license contract server, the registration information including information representing that the license contract is valid.

According to another aspect of the present invention, there is provided a method of managing a software license contract in a system for managing the software license contract, in which a first computer for executing target software which is a target of a license contract, and a second computer for performing the license contract of the target software are connected separately, the method comprising the steps in the first computer of: requesting the second computer to transfer, to a URL of the license contract server for license contract information input, a request including a part of license contract information necessary for the license contract and a URL in the target software to launch a license contract registration process of the target software; and launching the license contract registration process at a point in which a verification notification including the license contract information from the license contract server is transferred to the URL in the target software via the second computer in response to the request transferred by the second computer, transmitting, to the license contract server, registration information necessary for license contract registration including the license contract information, and registering the license contract of the target software when receiving, from the license contract server, the registration information including information representing that the license contract is valid.

According to still another aspect of the present invention, there is provided an information processing apparatus for executing target software which is a target of a license contract, the apparatus being connected to a license contract server in a license contract management system in separate from a computer for performing a license contract of the target software, the apparatus comprising: means for requesting the computer to transfer, to a URL of the license contract server for license contract information input, a request including a part of license contract information necessary for the license contract and a URL in the target software to launch a license contract registration process of the target software; and means for launching the license contract registration process at a point in which a verification notification including the license contract information from the license contract server is transferred to the URL in the target software via the computer in response to the request transferred by the computer, transmitting, to the license contract server, registration information necessary for license contract registration including the license contract information, and registering the license contract of the target software when receiving the registration information including information representing that the license contract is valid.

According to yet another aspect of the present invention, there is provided a program in target software which is executed by a first computer for executing the target software which is a target of a license contract, the program comprising the steps of: requesting a second computer for performing a license contract of target software, which is connected to a license contract server in separate from the first computer, to transfer, to a URL of the license contract server for license contract information input, a request including a part of license contract information necessary for the license contract and a URL in the target software to launch a license contract registration process of the target software; and launching the license contract registration process at a point in which a verification notification including the license contract information from the license contract server is transferred to the URL in the target software via the second computer in response to the request transferred by the second computer, transmitting, to the license contract server, registration information necessary for license contract registration including the license contract information, and registering the license contract of the target software when receiving, from the license contract server, the registration information including information representing that the license contract is valid.

The present invention enables a Web browser to be used by a user to operate a license contract registration process and target software for a license contract to run on different hosts. This increases user convenience.

A license contract information input server arranged on the Internet makes it possible to change information to be input by a user after distribution of target software for a license contract. This improves the flexibility of information collection for the license contract granting side.

Further features of the present invention will become apparent from the following description of exemplary embodiments with reference to the attached drawings.

BRIEF DESCRIPTION OF DRAWINGS

FIG. 5 is a view showing an example of a screen displayed on a Web browser when a license contract is unregistered;

FIG. 6 is a view showing another example of the screen displayed on the Web browser when a license contract is unregistered;

FIG. 7 is a view showing an example of the structure of a transferred response with which the target software for a license contract replies to the Web browser;

FIG. 9 is a view showing an example of a license contract information input screen;

BEST MODE FOR CARRYING OUT THE INVENTION

An embodiment of the present invention will now be described with reference to the accompanying drawings.

<Example of Arrangement of License Contract Management System According to Embodiment>

Figure 1:
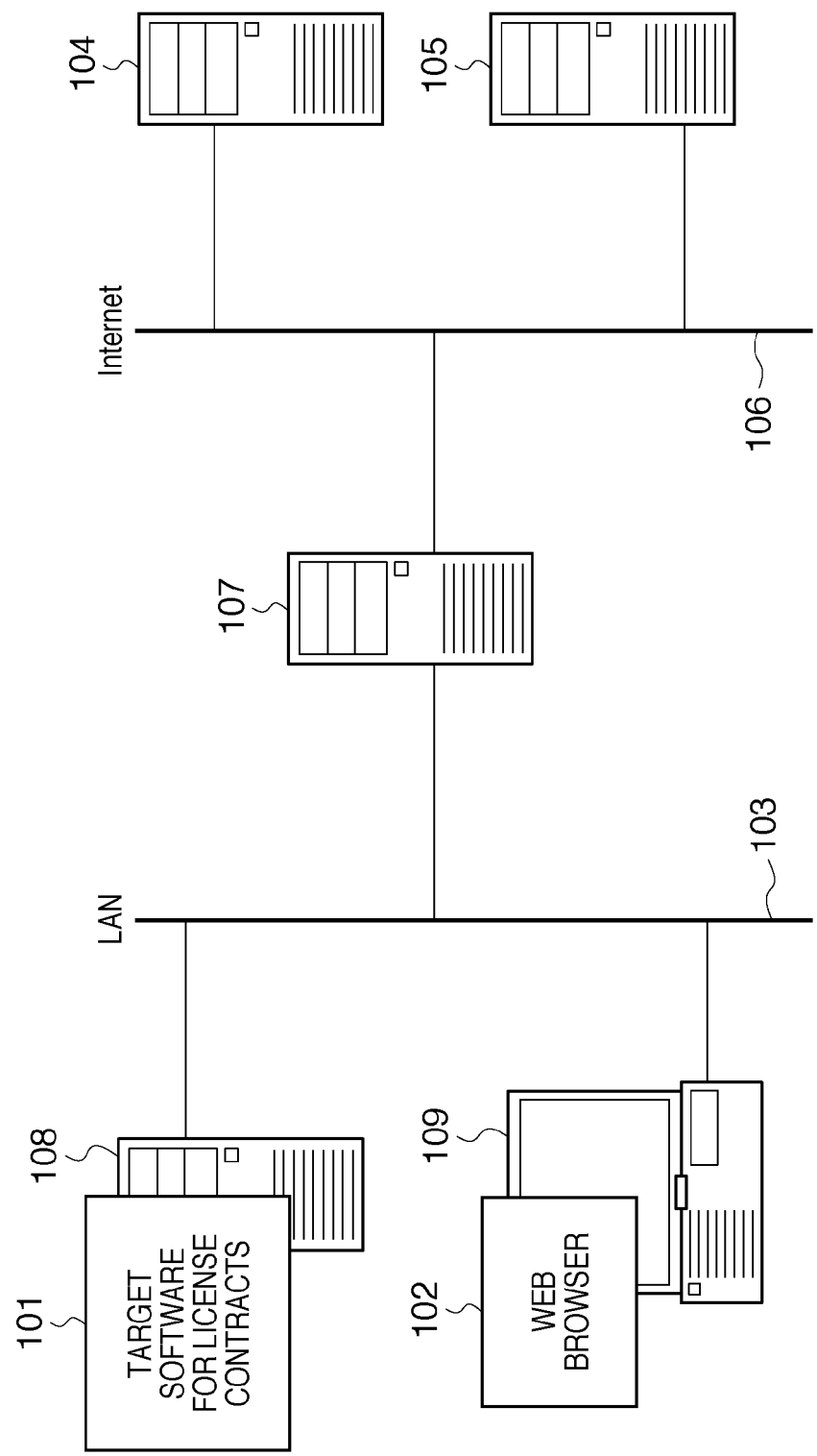
FIG. 1 is a block diagram showing an example of the arrangement of a license contract management system according to an embodiment.

FIG. 1 is a block diagram showing the constituent elements of a license contract management system according to the embodiment.

Referring to FIG. 1, reference numeral 108 denotes a host computer on which target software for license contracts 101 (to also be referred to as target software hereinafter) runs; and 109, a client PC on which a Web browser 102 runs. The host computer 108 and the client PC 109 are connected to each other via a local area network (to also be referred to as a LAN hereinafter) 103.

Reference numeral 104 denotes a license contract information input server (to also be referred to as an input server hereinafter); and 105, a license contract management server (to also be referred to as a management server hereinafter). The servers 104 and 105 are arranged on Internet 106 so as to be accessible all over the world. The management server 105 and the input server 104 comprise software that runs on a host computer. For the sake of simplicity, the arrangements of the host computers will also be referred to as the servers. Note that the input server 104 and the management server 105 can be a single computer. In this case, the computer will be referred to as a license contract server.

A proxy server 107 provides safe connection from the LAN 103 to the Internet 106. The proxy server 107 has a function of relaying a connection request from the LAN 103 to the Internet 106 but refusing a connection request from the Internet 106 to the LAN 103. This means that, for example, connection from the target software 101 to the management server 105 is possible, while connection from the management server 105 to the target software 101 is not possible.

<Example of Hardware Configuration of Computer According to Embodiment>

Figure 2:
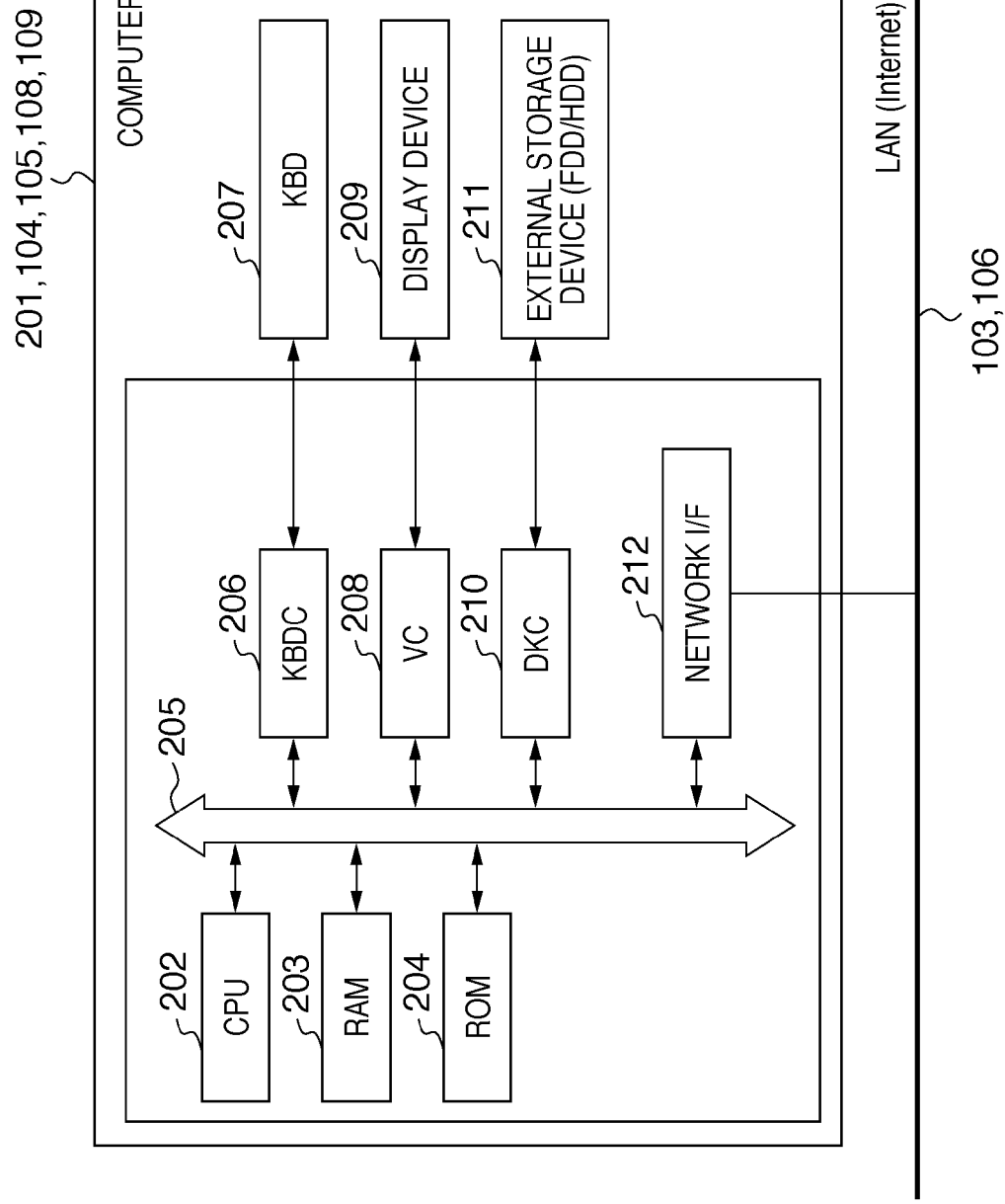
FIG. 2 is a block diagram showing an example of the hardware configuration of a host computer, client PC, or a server apparatus.

FIG. 2 is a block diagram showing an example of the hardware configuration of the host computer 108, client PC 109, or server apparatus (input server 104 or management server 105) shown in FIG. 1.

Referring to FIG. 2, a computer 201 which shows an example of the hardware configuration of the host computer 108, client PC 109, or server apparatus 104 or 105 includes a CPU 202, RAM 203, ROM 204, and external storage device 211.

The CPU 202 executes software stored in the ROM 204 or the external storage device 211 and collectively controls the devices connected to a system bus 205. The RAM 203 functions as the main memory or work area of the CPU 202. The RAM 203 stores data and flags for branch determination used in FIGS. 8, 11, and 15 to be described later. The external storage device 211 includes a hard disk drive (HET), a Floppy® disk drive (FDD), and the like. The external storage device 211 stores boot programs, operating system, various kinds of applications including an authentication server and authentication client, database data, font data, and user files. The external storage device 211 also stores the formats of display screens shown in FIGS. 5, 6, 9, and 14 and the formats of transmission/reception information shown in FIGS. 7 and 10.

A keyboard controller (KBDC) 206 sends, to the CPU 202, information input from a keyboard (KBD) 207 or a pointing device (not shown). A video controller (VC) 208 controls display on a display device 209 formed from a CRT or an LCD. A disk controller (DKC) 210 controls access to the external storage device 211. The computer is connected to the LAN 103 (or Internet 106) via a communication controller (network I/F) 212.

In the following description, an expression "a program, module, or service executes a process" will be used. This actually indicates that the CPU 202 executes the procedure of software stored in the storage units such as the HD, RAM, and ROM.

<First Configuration Example of Target Software for License Contract According to Embodiment>

Figure 3:
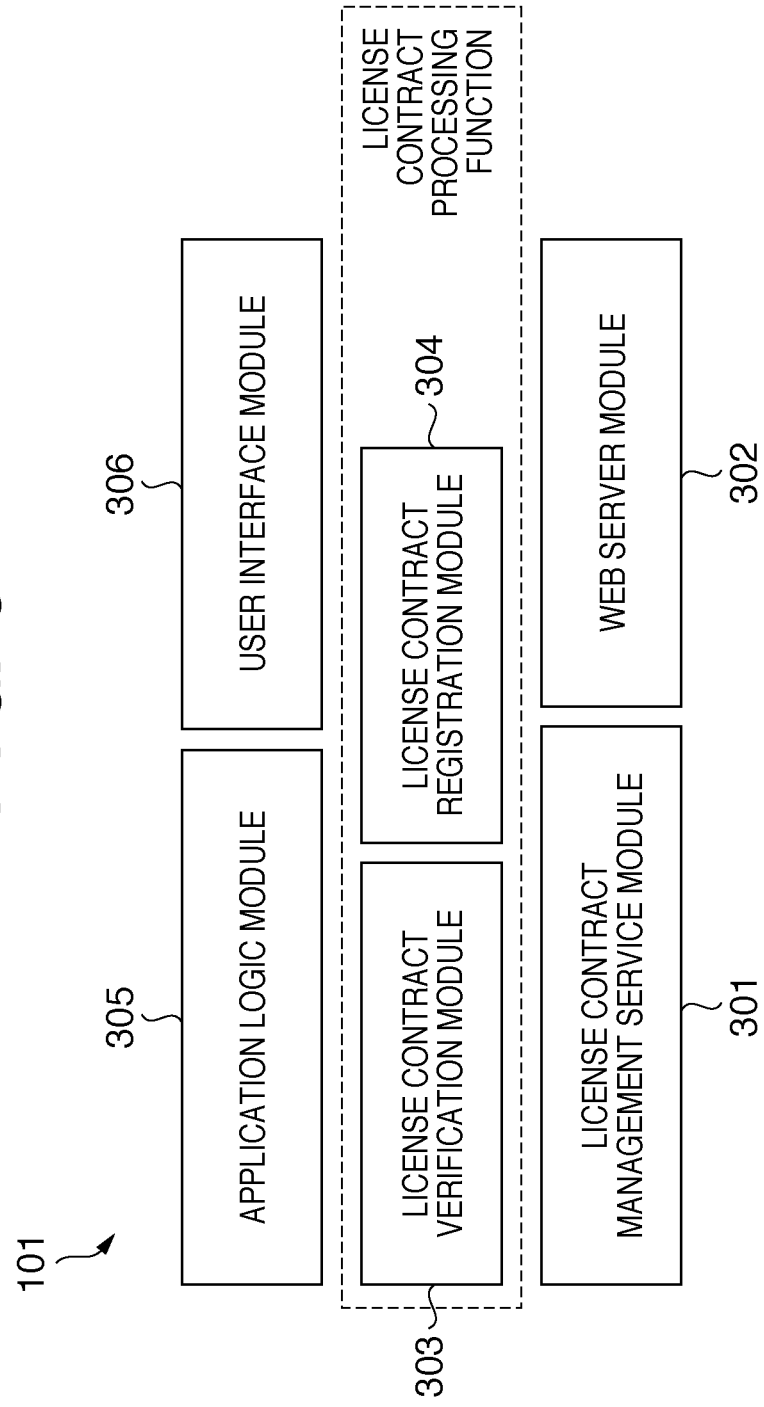
FIG. 3 is a block diagram showing an example of the configuration of target software for a license contract.

FIG. 3 is a block diagram showing an example of the configuration of the target software 101 for a license contract shown in FIG. 1.

Referring to FIG. 3, a license contract management service module (to also be referred to as a management service hereinafter) 301 is a service to manage a software license, and registers the license contract of target software or verifies license contract registration. A Web server module 302 receives a request from the Web browser 102, requests an application logic module 305 or a license contract registration module 304 to execute a process, and returns a result to the Web browser 102. Note that the license contract management service module 301 and the Web server module 302 are not included in the target software 101 and may provide the services to a plurality of kinds of target software or other Web applications simultaneously.

The application logic module 305 invokes a license contract verification module 303 to verify whether a license contract of the software is registered in the management service 301. If no license contract is registered, the application logic module 305 notifies the user of it and starts a license contract registration process or restricts the functions of the software in accordance with a user input. The license contract registration module 304 is activated by the Web browser 102 via the Web server module 302 and instructs the management service 301 to perform the license contract registration process for the management server 105.

The application logic module 305 provides the functions of the target software. Reference numeral 306 denotes a user interface module. In accordance with a request from the Web browser 102 and the application logic module 305, the user interface module 306 creates an HTML message as a response to the request and returns the response to the Web browser 102 via the Web server module 302.

<Example of Sequence up to License Contract Registration According to Embodiment>

Figure 4:
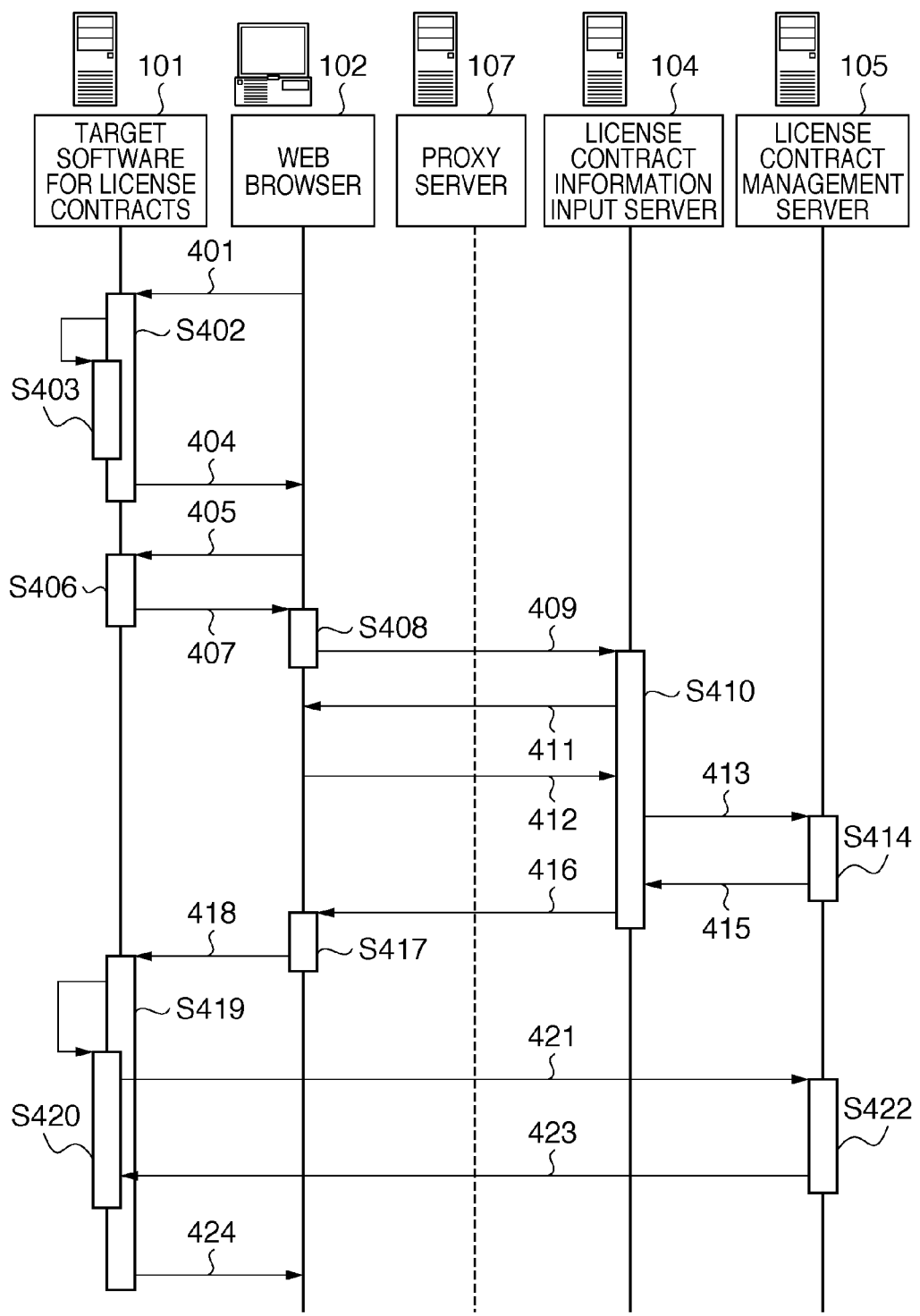
FIG. 4 is a sequence chart showing the sequence from a license contract request up to license contract registration.

FIG. 4 is a sequence chart showing the sequence up to license contract registration.

The overall sequence will roughly be divided into the following three parts and explained below in order. (1) The first part is a process from a request 401 of the Web browser 102 to a response 407 of the target software. (2) The next part is a process from transfer S408 of a request 409 of the Web browser 102 to transfer S417 of a response 416 of the input server 104. (3) The final part is a process from transmission of an HTTP request 418 from the to display of a license contract registration result 424 on the browser screen. The computer on which the target software 101 runs will be referred to as a first computer. The computer on which the Web browser 102 runs will be referred to as a second computer.

<Process from Request 401 of Web Browser 102 to Response 407 of Target Software>

First, the process from the request 401 of the Web browser 102 to the response 407 of the target software will be described.

Upon receiving a connection request from the user, the Web browser 102 transmits the request 401 to the target software 101. The target software 101 receives the request 401 and starts a process S402 for the request. In the process S402, the target software 101 inquires of the license contract verification module 303 about the presence/absence of license contract registration before the start of the process for the request 401 (S403). If it is determined upon the query that the license contract is unregistered, the target software 101 replies to the Web browser 102 with an HTML message 404 to display a page that notifies the license contract unregistration.

(First Example of Screen Displayed on Web Browser 102 by HTML Message 404)

FIG. 5 is a view showing an example of a screen displayed on the Web browser 102 by the HTML message 404 transmitted in the process S403.

This example assumes that a predetermined trial period is set for the target software 101. Within the trial period, both a "register a license contract now" button 501 and a "register a license contract later" button 502 are usable, and all functions of the target software 101 are usable. After the end of the trial period, the "register a license contract later" button 502 is unusable, and the functions of the target software 101 except license contract registration are unusable.

(Another Example of Screen Displayed on Web Browser 102 by HTML Message 404)

FIG. 6 is a view showing another example of the screen displayed on the Web browser 102 by the HTML message 404 transmitted in the process S403.

This example indicates that the usable functions of the target software are limited without license contract registration. When the user presses a "register a license contract now" button 601 and registers a license contract, the target software 101 provides all functions. However, upon detecting press of a "register a license contract later" button 602 is detected, the target software 101 places restrictions on the functions to be provided.

Referring back to FIG. 4, upon detecting press of the "register a license contract now" button 501 or 601 by the user, the Web browser 102 transmits an HTTP request 405 describing it to the target software 101 target software an HTTP protocol.

The target software 101 receives the HTTP request 405 and starts a process S406 of starting license contract registration. In the process S406, the target software 101 replies to the Web browser 102 with the response 407 to the HTTP request 405, to which part of information necessary for the license contract is added, so that the Web browser 102 transfers an HTTP page to the input server 104.

(Example of Response from Target Software 101 to Web Browser 102)

FIG. 7 shows an example of the transferred response 407 with which the target software 101 replies to the Web browser 102.

Referring to FIG. 7, reference numeral 701 denotes an HTTP header; and 702, an HTML text.

The HTML text 702 is an HTML message for displaying a screen to guide the Web browser to a target transfer destination in accordance with a user operation if transfer is not automatically done.

The Web browser 102 runs in accordance with the description in the HTTP header 701. A first line 703 of the HTTP header 701 is a status line which instructs the Web browser 102 to connect itself to a URL designated by a transfer destination designated portion 704 of the HTTP header 701. The contents of the transfer destination designated portion 704 can be separated into a URL address and URL parameters. The URL address portion indicates connection to "license.input.server.com/license/enduser/index.jsp" using the HTTPS protocol. In this example, "license.input.server.com" is the Internet address of the input server 104. The URL parameters include the following items.

APPID: C0000000405
CPUID: AQAQAAAA07SVLQAES7IS
LANGUAGE: ja
APPLICATION: MyApp
VERSION: 2.1.0
RTURL: HTTP://192.168.1.10/MyApp/License/RegisterLicense.aspx?

APPID is an identifier to identify the target software 101. CPUID is an identifier to uniquely identify the host computer 108 on which the target software 101 runs. LANGUAGE is a language to be used to display a license contract information input page. APPLICATION is the name of the target software 101. VERSION is the version of the target software 101. The final RTURL is the URL address in the target software to launch the license contract registration process 304 in the target software 101.

In this example, "192.168.1.10" is the IP address of the host computer 108, in the LAN 103, on which the target software 101 runs. The URL address is invoked in the process S417 (to be described later) of the Web browser 102 in accordance with an instruction from the input server 104.

Referring back to FIG. 4, upon receiving the response 407, the Web browser 102 connects itself to the input server 104 designated in the response (S408), and transmits the HTTP request 409 to acquire the designated license contract information input page 704.

(Sequence of Process from Reception of Request 401 to Reply with Response 407 by Target Software 101)

Figure 8:
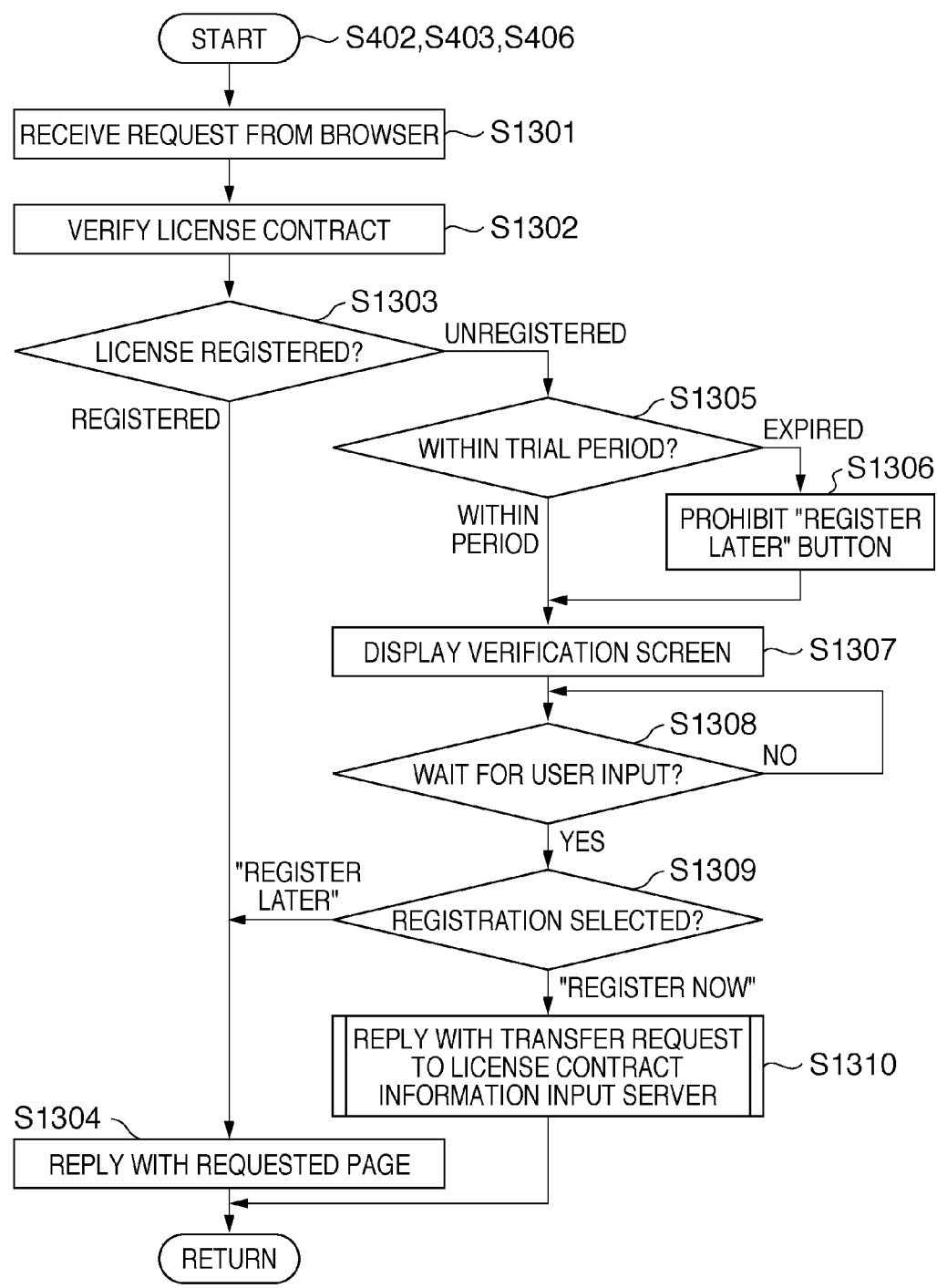
FIG. 8 is a flowchart illustrating an example of the procedure of a license contract verification process by the target software.

FIG. 8 is a flowchart illustrating the sequence of the process from reception of the request 401 to reply with the response 407 by the target software 101. As described above, this flowchart is actually executed by the CPU of the host computer 108 which executes the target software 101.

The target software 101 receives the request 401 from the Web browser 102 (S1301). Upon receiving the request 401, the target software 101 verifies the license contract by invoking the license contract verification module 303 (S1302). If it is determined by the license contract verification (S1303) that the license contract has already been registered, the target software 101 replies to the Web browser 102 with a page requested by the request 401 (S1304).

If it is determined by the license contract verification (S1303) that the license contract has been unregistered, the target software 101 further verifies whether the license contract is within the trial period (S1305). If the trial period has already ended, the target software invalidates the "register a license contract later" button 502 in FIG. 5 (S1306), and replies to the Web browser 102 with the response 404 to display the screen in FIG. 5 on the Web browser 102 (S1307).

Next, the target software 101 waits for reception of the request 405 transmitted from the Web browser 102 in accordance with a user input to the screen in FIG. 5 (S1308). The target software 101 verifies the received request 405 (S1309). Upon detecting press of the "register a license contract later" button 502, the target software 101 replies to the Web browser 102 with a page requested by the request 401 (S1304). Upon detecting press of the "register a license contract now" button 501, the target software 101 replies to the Web browser 102 with the response 407 shown in FIG. 7. The target software 101 instructs the Web browser 102 to transfer the request 704 included in the response 407 to the input server 104 (S1310).

<Process from Transfer S408 of Request 704 of Web Browser 102 to Transfer S417 of Response 416 of Input Server 104>

The process from the transfer S408 of the request 704 of the Web browser 102 to the transfer S417 of the response 416 of the input server 104 will be described next.

The input server 104 receives the request 409 and starts a license contract information input process S410. First, the input server 104 analyzes the received URL parameters. If the contents are correct, the input server 104 replies to the Web browser 102 with an HTTP response 411 to display a license contract information input page. The HTTP response at this time contains the information of APPID, CUPID, and RTURL designated by the URL parameters in FIG. 7 as, for example, HTTP hidden fields which are not displayed on the screen of the Web browser. If the URL parameters are not correct, the input server 104 replies to the Web browser 102 with an HTTP response to display an error screen (not shown).

(Example of License Contract Information Input Screen Displayed on Web Browser 102 by HTTP Response 411)

Figure 12:
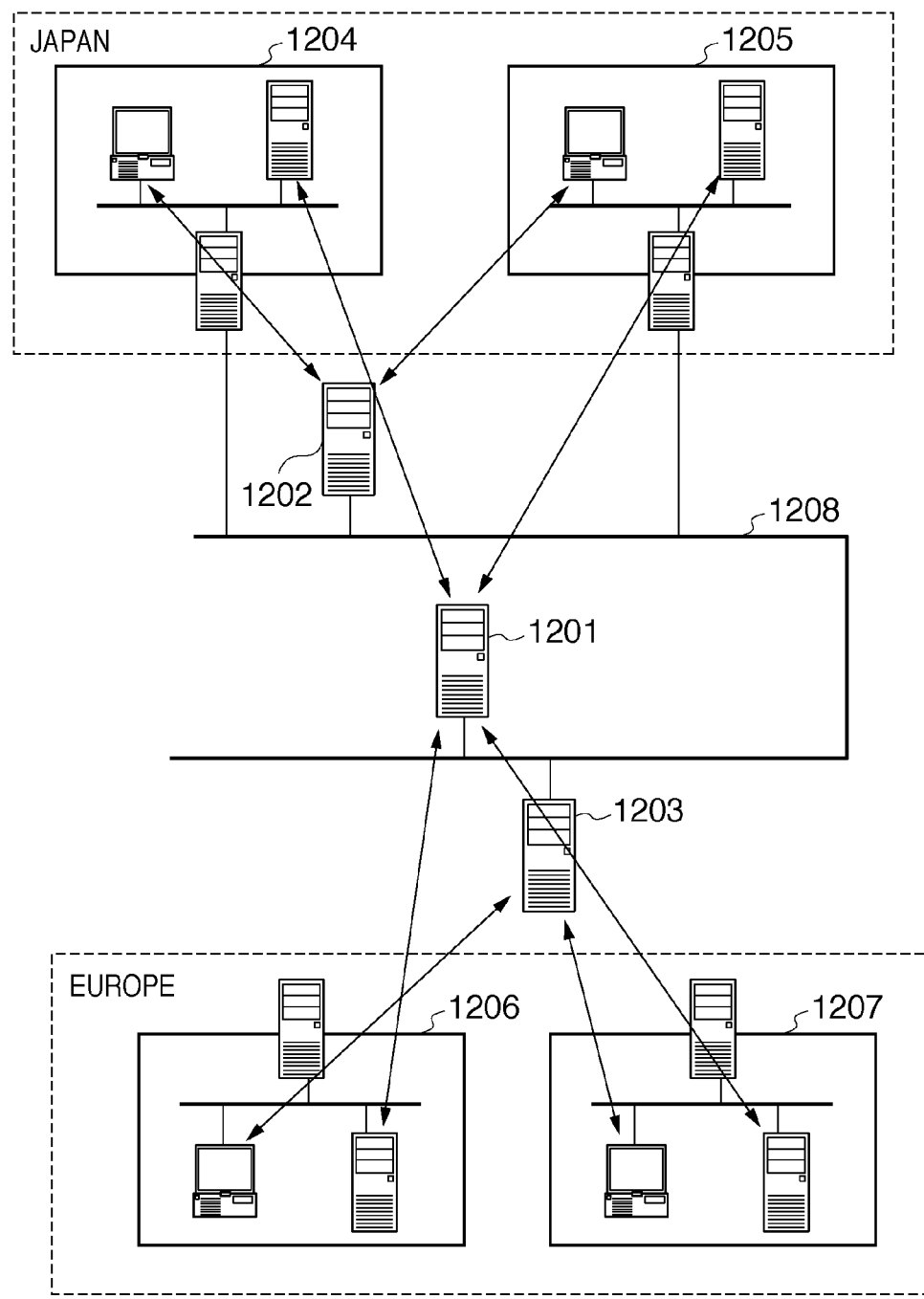
FIG. 12 is a block diagram showing an example of use of the license contract management system according to the embodiment.

FIG. 9 shows an example of a license contract information input screen displayed on the Web browser 102 by the HTTP response 411. Note that text boxes for a license contract management' system shown in FIG. 12 are indicated by broken lines in FIG. 9. These text boxes will be explained later with reference to FIG. 12.

Referring to FIG. 9, a software name 801 "MyApp" and a software version 802 "2.1.0" are values designated by the URL parameters in FIG. 7. A text box 803 is used to input the license number of the target software 101. The license number is normally given by the software selling company when the user has purchased the target software 101.

Text boxes 804 to 809 are used to input pieces of information about the user of the target software 101, which are often used by the selling company for the purpose of user management. These pieces of information are unnecessary when the user registers and verifies the license contract in the management server 105. However, since the management server 105 allows to freely change the information to be input by the user, the flexibility of information collection for the license contract granting side increases.

Referring back to FIG. 4, when the user inputs information and presses a "register" button 810, the Web browser 102 transmits an HTTP request 412 to the input server 104. In the license contract information input process S410, the input server 104 first extracts, from the received HTTP request 412, the information input by the user in FIG. 9 and various kinds of information embedded in the HTTP response 411 as the hidden fields. In the process S410, if the format of the extracted information is correct, the input server 104 transmits, to the management server 105, a request 413 to ask whether these pieces of information are correct. The management server 105 receives the request 413 for license contract verification, verifies whether the pieces of received information are correct, and replies to the input server 104 with a result 415 (S414).

The input server 104 receives the verification result 415 of the license contract verification request 413 from the management server 105 (S410). If the verification result 415 is correct, the input server 104 stores specific items of the information input by the user in FIG. 9 and the information included in the URL parameters of the HTTP request 409 in the database for the purpose of, for example, customer management. The input server 104 also replies to the Web browser 102 with the HTTP response 416 as a response to the HTTP request 412 to transfer a page added with information necessary for the license contract registration process to the URL represented by the RTURL contained in the HTTP request 409.

(Example of HTTP Response 416 from Input Server 104 to Web Browser)

Figure 10:
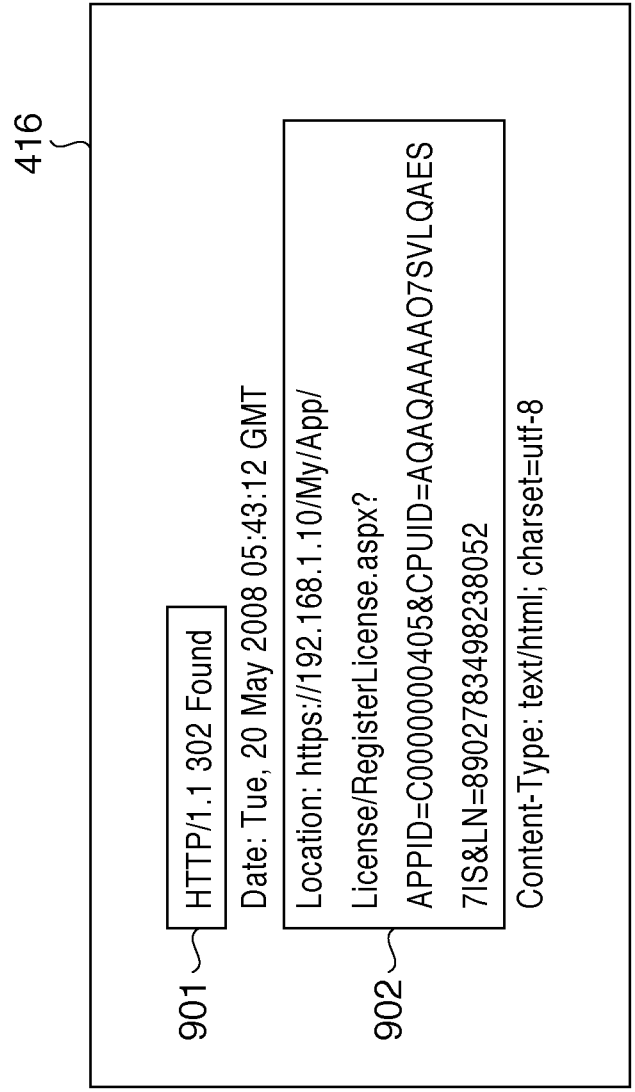
FIG. 10 is a view showing an example of the structure of a transferred response to the target software for a license contract, with which a license contract information input server replies to the Web browser.

FIG. 10 shows an example of the HTTP response 416 from the input server 104 to the Web browser.

A first line 901 of the HTTP header instructs the Web browser to perform transfer to the URL indicated by a transfer destination designated portion 902. In this example, "192.168.1.10" is the IP address of the host computer 108 on which the target software 101 runs.

Referring back to FIG. 4, the Web browser 102 receives the HTTP response 416, connects itself to the URL represented by the transfer destination designated portion 902, and transmits the HTTP request 418 (S417).

Normally, the input server 104 on the Internet cannot be connected to the target software 101 because of the presence of the proxy server 107. Hence, the input server 104 cannot transmit information necessary for the license contract to the target software 101. However, the transfer S417 by the Web browser 102 enables the input server 104 on the Internet to transmit information necessary for the license contract to the target software 101.

<Process from Transmission of HTTP Request 418 from Web Browser 102 to Display of License Contract Registration Result 424 on Browser Screen>

Finally, the process from transmission of the HTTP Request 418 from the Web browser 102 to display of the license contract registration result 424 on the browser screen will be described.

Upon receiving the HTTP request 418 to request the page represented by the transfer destination designated portion 902, the target software 101 invokes a license contract registration process S419 in the license contract registration module 304. In the license contract registration process S419, first, the target software 101 extracts pieces of information necessary for license contract registration, which are transferred as URL parameters in the HTTP request 418. In the example shown in FIG. 10, APPID (the identifier of the target software), CPUID (the identifier to uniquely identify the host on which the target software runs), and LN (the license number input by the user in FIG. 5) are information necessary for license contract registration.

In the license contract registration process S419, the target software 101 next verifies that the pieces of extracted information are correct. More specifically, it is verified that the APPID matches the identifier of the target software 101, the CPUID equals the identifier to uniquely identify the host on which the software runs, and the LN complies with the designated format. If the pieces of extracted information are correct, the license contract registration process S419 invokes an online license contract registration process S420 in the management service 301. In the online license contract registration process S420, the target software 101 transmits a request 421 containing information necessary for license registration to the management server 105 on the Internet.

Upon receiving the request 421 for license contract registration, the management server 105 inspects the information in the request 421. If the pieces of information are correct, the management server 105 replies to the target software with data 423 necessary for the license contract registration module 304 to register the license contract (S422).

In the online license contract registration process S420, the target software 101 receives the license contract registration data 423 from the management server 105 and validates the license contract of the target software 101 using the data. Finally, the target software 101 replies to the Web browser 102 with the license contract registration result 424. The Web browser 102 displays the received result on the browser screen (not shown).

(Sequence of Process from Reception of HTTP Request 418 to Display of Registration Result 424 by Target Software 101)

Figure 11:
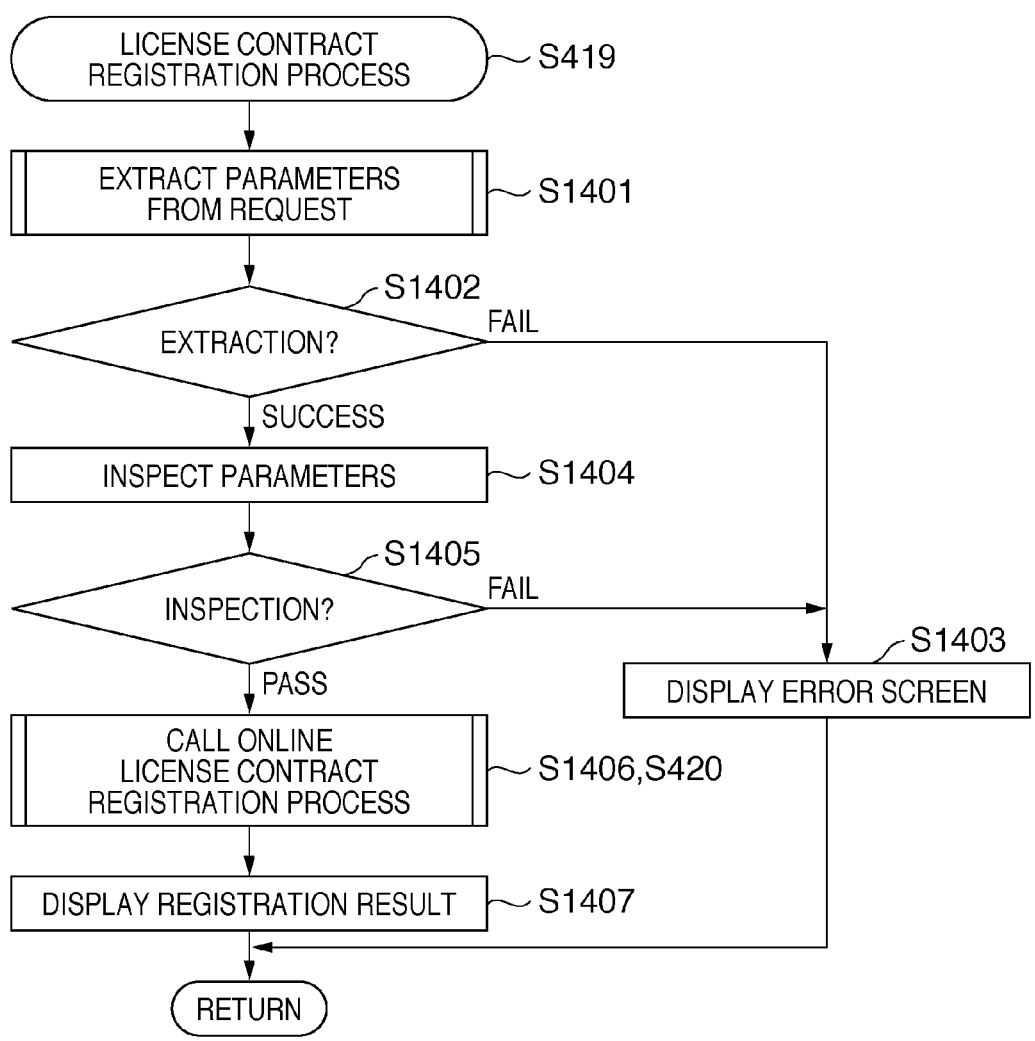
FIG. 11 is a flowchart illustrating an example of the procedure of a license contract registration process by the target software.

FIG. 11 is a flowchart illustrating the sequence of the license contract registration process S419. As described above, this flowchart is actually executed by the CPU of the host computer 108 which executes the target software 101.

In the license contract registration process S419, first, the target software 101 extracts necessary parameters from the received request 418 (S1401). The extraction result is determined (S1402). If the extraction has failed because of, for example, the shortage of necessary parameters, the target software 101 returns a response to display an error screen (not shown) to the Web browser 102 in the license contract registration process S419 (S1403).

If the extraction has succeeded, the target software 101 verifies the correctness of the extracted parameters in the license contract registration process S419 (S1404). If any problem that, for example, a parameter value falls outside its range, has no expected value, or has an incorrect format is detected as the result of the parameter value correctness verification (S1405), the target software 101 returns a response to display an error screen (not shown) (S1403).

If the parameter values are correct, the license contract registration process S419 calls the online license contract registration process S420 in the management service 301 (S1406). The target software 101 registers the license contract in accordance with the response 423 from the management server 105 and replies to the Web browser 102 with the response 424 to display the result (S1407).

With the above-described process, the license contract verification module 303 returns a response representing that the license contract is valid to the license contract verification invocation from the application logic module 305. The application logic module 305 then operates without any restrictions.

Using secure communication such as HTTPS between the input server 104 and the management server on the Internet in FIG. 4 allows to prevent license contract number leakage to the Internet.

<Another Example of Arrangement of License Contract Management System According to Embodiment>

FIG. 12 showing an example of use of the license contract management system according to the present invention.

Referring to FIG. 12, reference numeral 1201 denotes a management server; 1202, an input server for Japan; 1203, an input server for Europe; 1204 and 1205, systems of users of target software for Japan; and 1206 and 1207, systems of users of target software for Europe. The servers and systems are connected to Internet 1208 via proxy servers as needed.

The user information input items displayed on the screen shown in FIG. 9 change between the software for Japan and that for Europe. For example, Europe, "country name 1210", "number 1211 of employees", and "category 1212 of industry" whose text boxes are indicated by broken lines need to be input, in addition to the items shown in FIG. 9.

The system can cope with this situation only by setting the URL of the license contract input server 104, which is the transfer request target of the HTTP response 407 shown in FIG. 4, in the input server 1203 for Europe in the target software for Europe, or, for Japan, in the input server 1202 for Japan. Additionally, when providing target software for example, USA starts, the system can cope with this only by installing an input server for USA and setting the URL in the target software to the URL in the input server.

<Another Example of Use of License Contract According to Embodiment>

As a characteristic feature of the embodiment, the target software 101 includes basic software 1001 and a license contract target plug-in 1002 (to also be referred to as a target plug-in hereinafter). A plurality of target plug-ins 1002 can additionally be installed on the basic software 1001. In this case, each plug-in needs a license contract.

The remaining fundamental components are the same as in FIG. 3, and the reference numerals in FIG. 3 are applied to the common parts.

(Another Configuration Example of Target Software for License Contract According to Embodiment)

Figure 13:
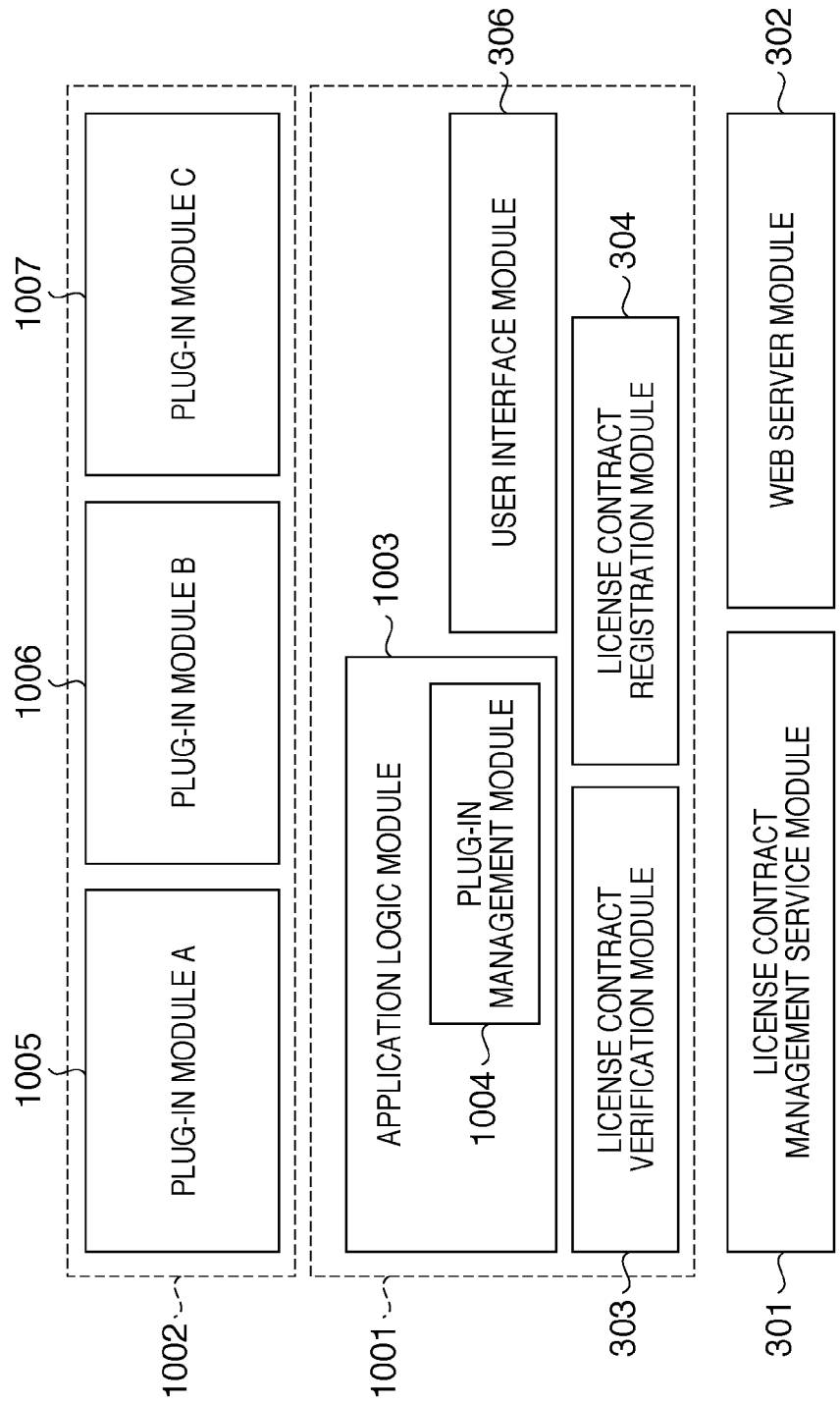
FIG. 13 is a block diagram showing another example of the configuration of the target software for a license contract according to the embodiment.

FIG. 13 is a block diagram showing another example of the configuration of the target software in the license contract management system according to the embodiment.

Referring to FIG. 13, the target software 101 includes the license contract management service module 301, Web server module 302, basic software 1001, and plug-in group 1002.

The plug-in group 1002 includes a plurality of target plug-ins. In this example, three plug-in modules A 1005, B 1006, and C 1007 are installed on the basic software 1001. The plurality of target plug-ins individually require license contracts.

The basic software 1001 further includes the license contract verification module 303, license contract registration module 304, application logic module 1003, and user interface module 306. The application logic module 1003 controls the overall basic software 1001 and includes a plug-in management module 1004. The plug-in management module 1004 executes addition/delete of target plug-ins and a process of registering the license contracts of target plug-in modules.

The plug-in module A 1005 will be referred to as the plug-in module 1005 hereinafter, which is assumed to represent the target plug-in modules. The plug-in module 1005 is invoked by the application logic module 1003 or the Web server module 302 in accordance with, for example, a user operation.

The plug-in module 1005 first transfers an identifier to identify the target plug-in to the plug-in management module 1004 and requests it to verify the license contract. The plug-in management module 1004 further requests the license contract verification module 303 to do the same verification. The license contract verification module 303 inquires of the management service 301 about the presence/absence of the license contract of the given target plug-in.

The query result is transmitted from the management service 301 to the license contract verification module 303 and then to the plug-in management module 1004, and finally returned to the plug-in module 1005. In accordance with the obtained presence/absence of a license contract, the plug-in module 1005 executes a requested function if the contract is valid. If the contract is invalid, the plug-in module 1005 notifies the user that the license is invalid or is prohibited from executing the requested function.

(Example of Plug-In Management Screen of Basic Program 1001 According to Embodiment)

Figure 14:
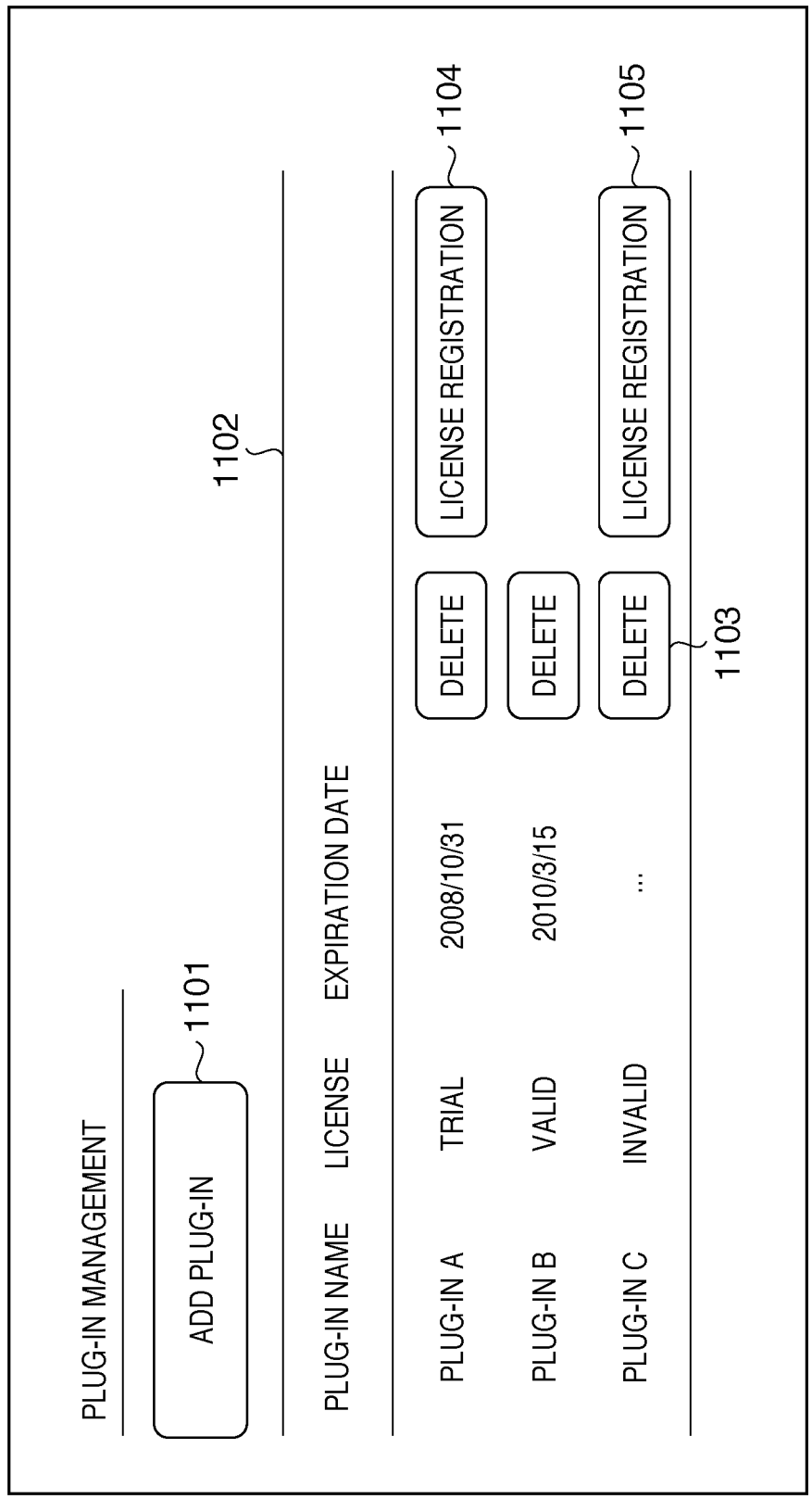
FIG. 14 is a view showing an example of the plug-in management screen of a basic program 1001.

FIG. 14 shows an example of the plug-in management screen of the basic program 1001.

Upon receiving press of an "add plug-in" button 1101 on the screen, the plug-in management module 1004 starts a target plug-in module addition process (detailed description will be omitted). Added target plug-in modules are displayed in a plug-in list 1102. The list includes the name, license format, and license expiration date of each plug-in, buttons 1103 to delete the plug-ins, and buttons 1104 and 1105 to start license contract registration of target plug-in modules whose license contracts are unregistered.

Upon detecting press of the "delete" button 1103, the plug-in management module 1004 deletes the corresponding target plug-in module (detailed description will be omitted).

There are three kinds of license formats "trial", "valid", and "invalid" in the example of FIG. 14. In "trial", after installation of a target plug-in module, the target plug-in is usable during a predetermined period. After the expiration date shown in the column of expiration date, the target plug-in module does not operate. "Valid" indicates that the license contract is already registered. Even if the license contract registration has been done, the plug-in module does not operate after the expiration date. "Invalid" indicates that the license contract of "trial" or "valid" has expired, or license contract registration has not been done yet for a target plug-in module having no trial period. The invalid plug-in module does not operate.

Upon detecting press of the "license registration" button 1104 or 1105, the plug-in management module 1004 starts the license contract registration process of the designated target plug-in module. The process after detecting press of the button is the same as that from S406 in FIG. 4, and a detailed description thereof will be omitted.

(Another Sequence of Process from Reception of Request 401 to Reply with Response 407 by Target Software 101)

Figure 15:
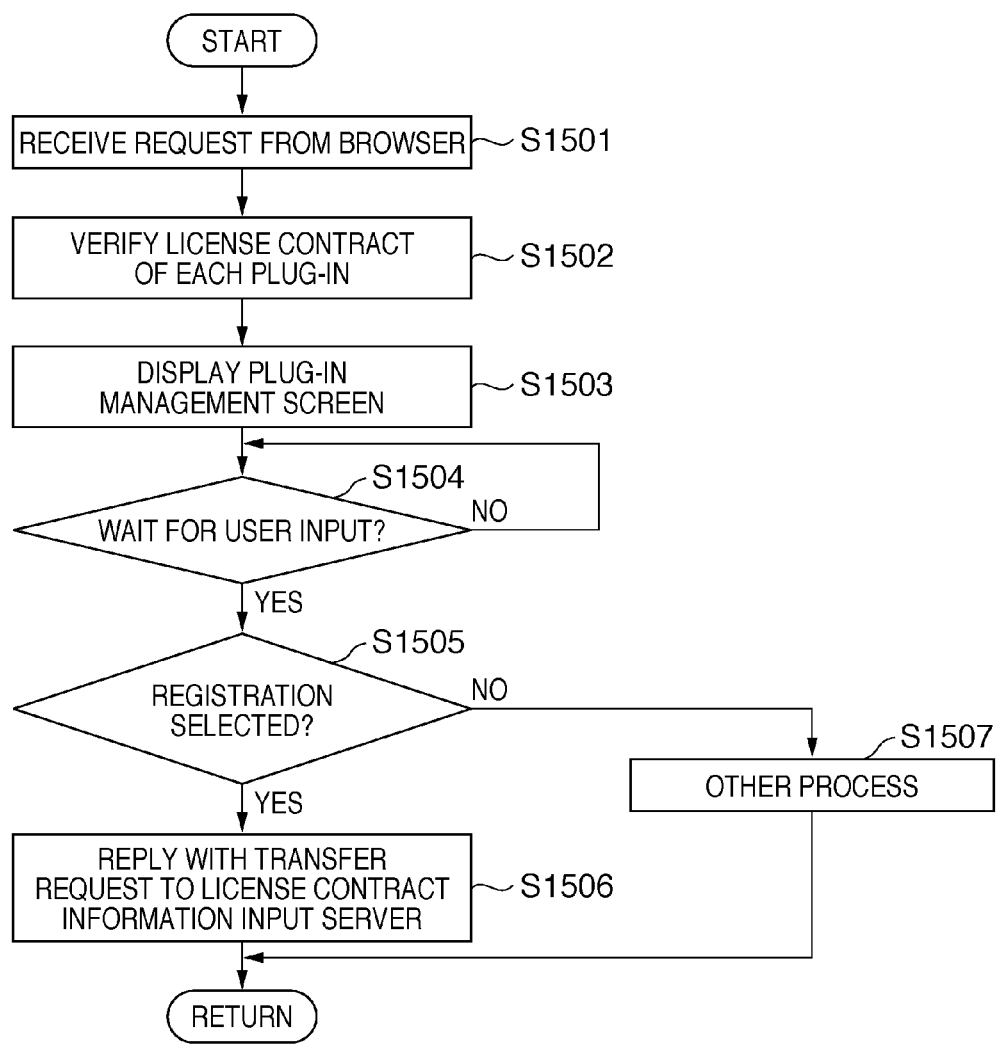
FIG. 15 is a flowchart illustrating an example of the procedure of a license contract verification process by the target software for a license contract, which has the other configuration example shown in FIG. 13.

FIG. 15 is a flowchart illustrating another sequence of the process from reception of the request 401 to reply with the response 407 by the target software 101 having a plug-in module. As described above, this flowchart is actually executed by the CPU of the host computer 108 which executes the target software 101.

First, the target software 101 receives the request 401 from the Web browser 102 (S1501). Upon receiving the request 401, the target software 101 verifies the license contract of each plug-in module by invoking the license contract verification module 303 (S1502). The target software 101 replies to the Web browser 102 with the result of license contract registration verification of each plug-in module using the screen shown in FIG. 14 (S1503).

Next, the target software 101 waits for reception of the request 405 transmitted from the Web browser 102 in accordance with a user input to the screen in FIG. 14 (S1504). The target software 101 verifies the received request 405 (S1505). Upon detecting press of the "license registration" button 1104 or 1105 in FIG. 14, the target software 101 replies to the Web browser 102 with the response 407 shown in FIG. 7. The target software 101 instructs the Web browser 102 to transfer the request 704 contained in the response 407 to the input server 104 (S1506). On the other hand, if no "license registration" button is pressed ("delete" or "addition"), another process corresponding to the instruction is performed (S1507).

As described above, even when the first computer and the second computer are separately connected to the license contract management system, the user can register a license contract by a simple operation.

The present invention is applicable to a system including a plurality of devices or an apparatus including a single device. Examples are a scanner, printer, PC, copying machine, multifunction peripheral, and facsimile apparatus.

The present invention is achieved even by supplying a software program which implements the functions of the above-described embodiment to the system or apparatus directly or from a remote site. A computer included in the system or the like reads out and executes the supplied program code.

Hence, the program code itself which is installed in the computer to implement the functions and processes of the present invention by the computer also implements the present invention. That is, the present invention incorporates the computer program itself for implementing the functions and processes.

In this case, the program can take any form such as an object code, a program to be executed by an interpreter, or script data to be supplied to the OS as long as the functions of the program can be obtained. Examples of the recording medium to supply the program are a flexible disk, hard disk, optical disk, magnetooptical disk, MO, CD-ROM, CD-R, and CD-RW. Other examples of the recording medium are a magnetic tape, nonvolatile memory card, ROM, and DVD (DVD-ROM or DVD-R).

The program may be downloaded from a Web site on the Internet/intranet using a browser in a client computer. More specifically, the computer program of the present invention itself or a compressed file containing an automatic installation function may be downloaded from the Web site to a recording medium such as a hard disk. The program code contained in the program of the present invention may be divided into a plurality of files, and the files may be downloaded from different Web sites. That is, the present invention can also incorporate a WWW server which causes a plurality of users to download a program file that implements the functions and processes of the present invention by a computer.

The program of the present invention may be encrypted, stored in a storage medium such as a CD-ROM, and delivered to users. In this case, only users who satisfy predetermined conditions are allowed to download key information for decryption from a Web site via the Internet/intranet so that they can decrypt the encrypted program using the key information, execute it, and install the program in the computer.

The functions of the above-described embodiment may be implemented by causing the computer to execute the readout program. The OS or the like running on the computer may partially or wholly execute actual processing based on the instructions of the program. In this case as well, the functions of the above-described embodiment can be implemented.

The program read out from the recording medium may be written in the memory of a function expansion board inserted into the computer or a function expansion unit connected to the computer. The CPU or the like of the function expansion board or function expansion unit may partially or wholly execute actual processing based on the instructions of the program. The functions of the above-described embodiment can be implemented in this way.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-171242 filed on Jun. 30, 2008, which is hereby incorporated by reference herein in its entirety.

The invention claimed is:

1. A system which comprises a license management system, a first computer for executing target software which is a target of a license contract, and a second computer which is different from said first computer,
   wherein said first computer comprises:
   a first transferring unit configured to, in response to a request of a license registration from said second computer, transfer, to said second computer, an identifier of said first computer, an identifier of the target software and first access information for accessing to said license management system; and
   wherein said second computer comprises:
   a first access unit configured to perform an access to said license management system using the first access information received from said first computer by a web browser;
   an input unit configured to input a license number via a screen provided by said license management system according to the access using the first access information by the first access unit;
   a second transferring unit configured to transfer the identifier of said first computer and the identifier of the target software to said license management system, wherein the second transferring unit transfers the input license number to said license management system;
   a reception unit configured to receive, from said license management system, a response including second access information for accessing to said first computer;
   a second access unit configured to perform an access to said first computer using the second access information received by the reception unit by the web browser;
   a third transferring unit configured to transfer, to said first computer, the identifier of said first computer, the identifier of the target software and the license number according to the access using the second access information by the second access unit, and
   wherein said first computer further comprises:
   a request unit configured to perform a request of a license to said license management system by using the identifier of said first computer, the identifier of the target software and the license number; and a validation unit configured to validate the target software based on a response corresponding to the request of the license by the request unit, wherein said license management system issues, as the response, without via the second computer, data for validating the target software to said first computer for executing the target software.

2. The system according to claim 1, wherein the second transferring unit and the request unit use one of an HTTP and HTTPS.

3. The system according to claim 1, wherein the target software includes a plurality of plug-in modules capable of being added or deleted, and the license is managed independently for each of the plurality of plug-in modules in said license management system.

4. The system according to claim 1, wherein the first transferring unit transfers the first access information corresponding to country information of the target software.

5. The system according to claim 1, wherein the input unit further inputs information about a user of the target software, and the second transferring unit transfers the input information about the user of the target software to said license management system.

6. The system according to claim 1, wherein the second transferring unit transfers the identifier of said first computer and the identifier of the target software to said license management system upon the access using the first access information.

7. The system according to claim 1, wherein the first access information is address information for accessing a page for a license contract.

8. The system according to claim 1, wherein said license management system comprises a license contract information input server and a license contract management server which manages the license contract.

9. The system according to claim 1, wherein the target software is a Web application.

10. A first computer for executing target software which is a target of a license contract, comprising:

a transferring unit configured to, in response to a request of a license registration from a second computer, transfer, to the second computer, an identifier of said first computer, an identifier of the target software and first access information for accessing to a license management system, wherein said second computer i) performs an access to said license management system using the first access information received from said transferring unit of said first computer by a web browser, ii) inputs a license number via a screen provided by said license management system according to the access using the first access information, iii) transfers the identifier of said first computer, the identifier of the target software and the input license number to said license management system, iv) receives, from said license management system, a response including second access information for accessing to said first computer, v) accesses to said first computer using the received second access information by the web browser, and vi) transfers, to said first computer, the identifier of said first computer, the identifier of the target software and the license number according to the access using the second access information;

a reception unit configured to receive, from said second computer, the license number transferred by said second computer according to the access using said second access information;

a request unit configured to perform a request of a license to said license management system by using the identifier of said first computer, the identifier of the target software and the received license number; and a validation unit configured to validate the target software based on a response corresponding to the request of the license by the request unit, wherein said license management system issues, as the response, without via the second computer, data for validating the target software to said first computer for executing the target software.

11. The first computer according to claim 10, wherein the first access information is address information for accessing a page for a license contract.

12. The first computer according to claim 10, wherein said license management system comprises a license contract information input server and a license contract management server which manages the license contract.

13. The first computer according to claim 10, wherein the request unit uses one of an HTTP and HTTPS.

14. The first computer according to claim 10, wherein the target software includes a plurality of plug-in modules capable of being added or deleted, and the license is managed independently for each of the plurality of plug-in modules in said license management system.

15. A method executed by a system which comprises a license management system, a first computer for executing target software which is a target of a license contract, and a second computer which is different from said first computer, the method comprising: in said first computer, in response to a request of a license registration from said second computer, transferring, to said second computer, an identifier of said first computer, an identifier of the target software and first access information for accessing to said license management system, and in said second computer, performing an access to said license management system using the first access information received from said first computer by a web browser;

inputting a license number via a screen provided by said license management system according to the access by using the first access information via the web browser received transferring the identifier of said first computer and the identifier of the target software to said license management system, wherein the input license number is transferred to said license management system;

receiving, from said license management system, a response including second access information for accessing to said first computer; and performing an access to said first computer using the second access information received in the receiving step by the web browser; and transferring, to said first computer, the identifier of said first computer, the identifier of the target software and the license number according to the access by using the second access information via the web browser, and in said first computer, performing a request of a license to said license management system by using the identifier of said first computer, the identifier of the target software and the license number;

a third transferring unit configured to transfer, to said first computer, the identifier of said first computer, the identifier of the target software and the license number according to the access using the second access information by the second access unit; and validating the target software based on a response corresponding to the request of the license, wherein said license management system, issues, as the response, without via the second computer, data for validating the target software to said first computer for executing the target software.

16. A method executed by a first computer for executing target software which is a target of a license contract, the method comprising:
- in response to a request of a license registration from a second computer, transferring, to the second computer, an identifier of said first computer, an identifier of the target software and first access information for accessing to a license management system,
- wherein said second computer i) performs an access to said license management system using the first access information received from said transferring unit of said first computer by a web browser, ii) inputs a license number via a screen provided by said license management system according to the access using the first access information, iii) transfers the identifier of said first computer, the identifier of the target software and the input license number to said license management system, iv) receives, from said license management system, a response including second access information for accessing to said first computer, v) accesses to said first computer using the received second access information by the web browser, and vi) transfers, to said first computer, the identifier of said first computer, the identifier of the target software and the license number according to the access using the second access information;
- receiving, from said second computer, the license number transferred by said second computer according to the access using said second access information;
- performing a request of a license to said license management system by using the identifier of said first computer, the identifier of the target software and the received license number; and
- validating the target software based on a response corresponding to the request of the license, wherein in said license management system, issues, as the response, without via the second computer, data for validating the target software to said first computer for executing the target software.

17. A non-transitory computer-readable medium storing a program that causes a computer to execute a method by a first computer for executing target software which is a target of a license contract, the method comprising:
- in response to a request of a license registration from a second computer, transferring, to the second computer, an identifier of said first computer, an identifier of the target software and first access information for accessing to a license management system,
- wherein said second computer i) performs an access to said license management system using the first access information received from said transferring unit of said first computer by a web browser, ii) inputs a license number via a screen provided by said license management system according to the access using the first access information, iii) transfers the identifier of said first computer, the identifier of the target software and the input license number to said license management system, iv) receives, from said license management system, a response including second access information for accessing to said first computer, v) accesses to said first computer using the received second access information by the web browser, and vi) transfers, to said first computer, the identifier of said first computer, the identifier of the target software and the license number according to the access using the second access information;
- receiving, from said second computer, the license number transferred by said second computer according to the access using said second access information;
- performing a request of a license to said license management system by using the identifier of said first computer, the identifier of the target software and the received license number; and
- validating the target software based on a response corresponding to the request of the license,
- wherein said license management system issues, as the response, without via the second computer, data for validating the target software to said first computer for executing the target software.

* * * * *